United States Patent
Fujiu et al.

(10) Patent No.: US 7,469,616 B2
(45) Date of Patent: Dec. 30, 2008

(54) STEERING WHEEL POSITION ADJUSTMENT DEVICE

(75) Inventors: Isao Fujiu, Gunma-ken (JP); Minoru Takakusaki, Gunma-ken (JP)

(73) Assignee: Yamada Manufacturing Co., Ltd., Kiryu-shi, Gunma-ken (JP)

( * ) Notice: Subject to any disclaimer, the term of this patent is extended or adjusted under 35 U.S.C. 154(b) by 71 days.

(21) Appl. No.: 11/392,659

(22) Filed: Mar. 30, 2006

(65) Prior Publication Data

US 2006/0219043 A1  Oct. 5, 2006

(30) Foreign Application Priority Data

Mar. 31, 2005  (JP) ............................. 2005-101116

(51) Int. Cl.
  *B62D 1/18* (2006.01)
(52) U.S. Cl. ..................................... 74/493
(58) Field of Classification Search ............... 74/492, 74/493; 280/775, 777
  See application file for complete search history.

(56) References Cited

U.S. PATENT DOCUMENTS

| | | | | |
|---|---|---|---|---|
| 5,439,252 A | * | 8/1995 | Oxley et al. ................. | 280/775 |
| 6,189,405 B1 | * | 2/2001 | Yazane ........................ | 74/493 |
| 6,343,523 B1 | * | 2/2002 | Castellon ..................... | 74/493 |
| 6,450,531 B1 | * | 9/2002 | Rinker et al. ................ | 280/775 |
| 6,467,807 B2 | * | 10/2002 | Ikeda et al. ................. | 280/775 |
| 6,543,807 B2 | * | 4/2003 | Fujiu et al. .................. | 280/775 |
| 6,964,432 B2 | * | 11/2005 | Morita et al. ............... | 280/775 |
| 2004/0104565 A1 | * | 6/2004 | Tsuji et al. .................. | 280/775 |
| 2005/0189756 A1 | * | 9/2005 | Ridgway et al. ............ | 280/775 |
| 2005/0217407 A1 | * | 10/2005 | Yamamura ................... | 74/492 |

FOREIGN PATENT DOCUMENTS

JP  2000-16305  1/2000

* cited by examiner

*Primary Examiner*—Richard W Ridley
*Assistant Examiner*—Matthew Johnson
(74) *Attorney, Agent, or Firm*—McGinn IP Law Group, PLLC

(57) ABSTRACT

A steering wheel position adjustment device in a steering device includes a tilt telescopic adjustment mechanism. A column housing, through which a column pipe passes and is fixed thereto, is fitted to a fixed bracket so that the column housing can either freely move or be fixed in the axial direction. The column pipe is inserted slidably in an insertion hole of a pivot housing that is fitted to be able to swing freely and be fixed to the front of the column housing in the axial direction. An upper shaft is provided, within the column pipe, that moves together with the column pipe in the axial direction. A lower shaft is provided in the pivot housing. The upper shaft transmits rotation to the lower shaft, and the upper shaft and the lower shaft are connected to be able to slide freely relative to each other.

4 Claims, 8 Drawing Sheets

Fig. 1A
Fig. 1B
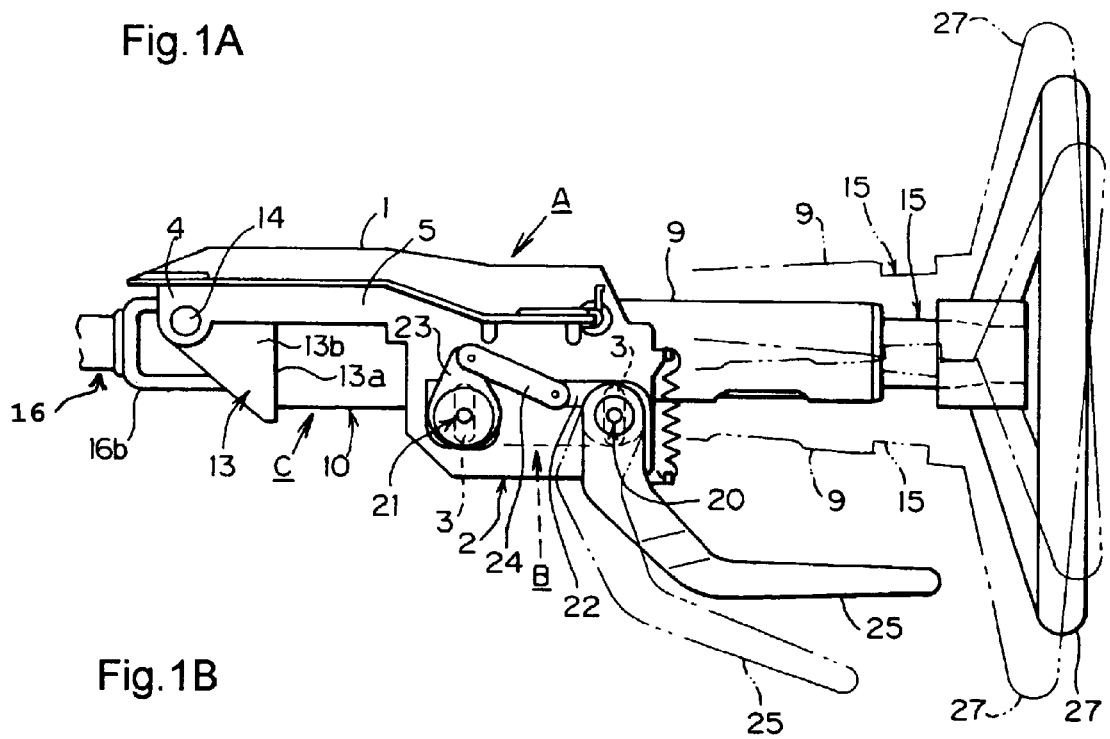
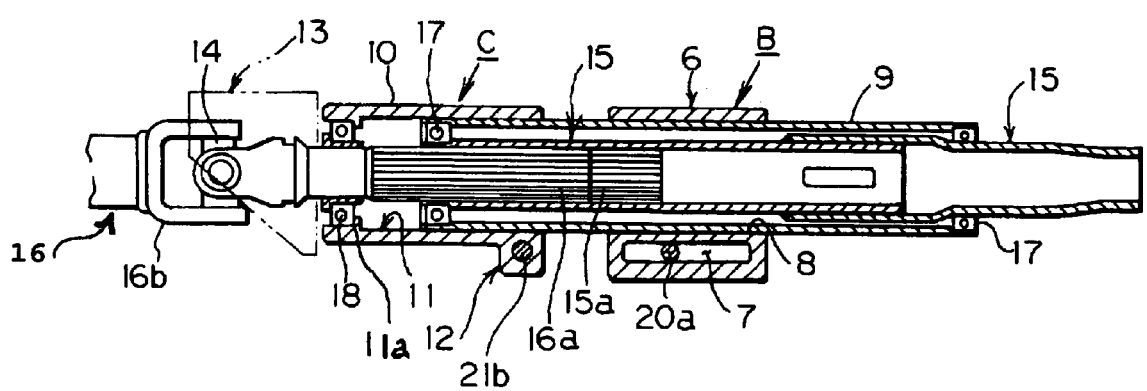

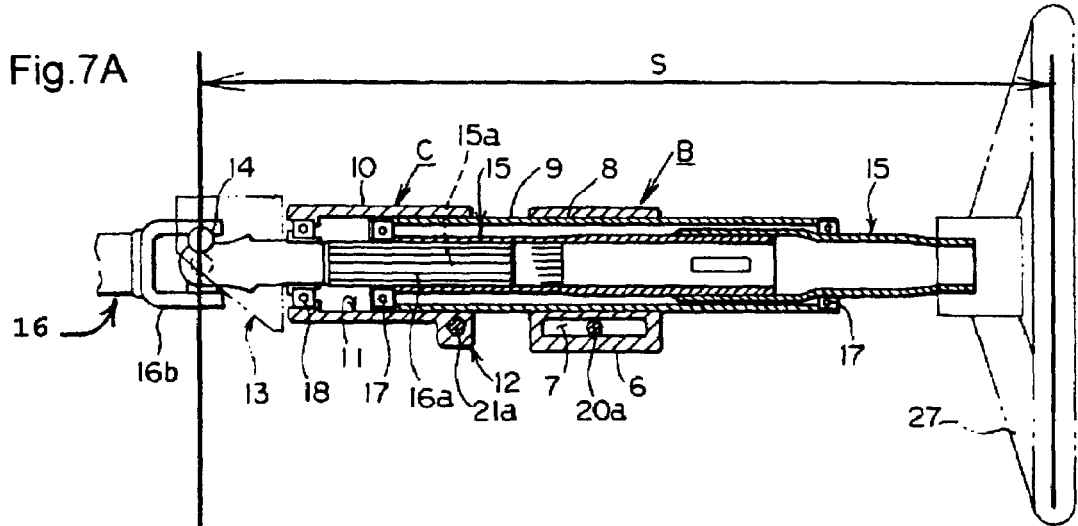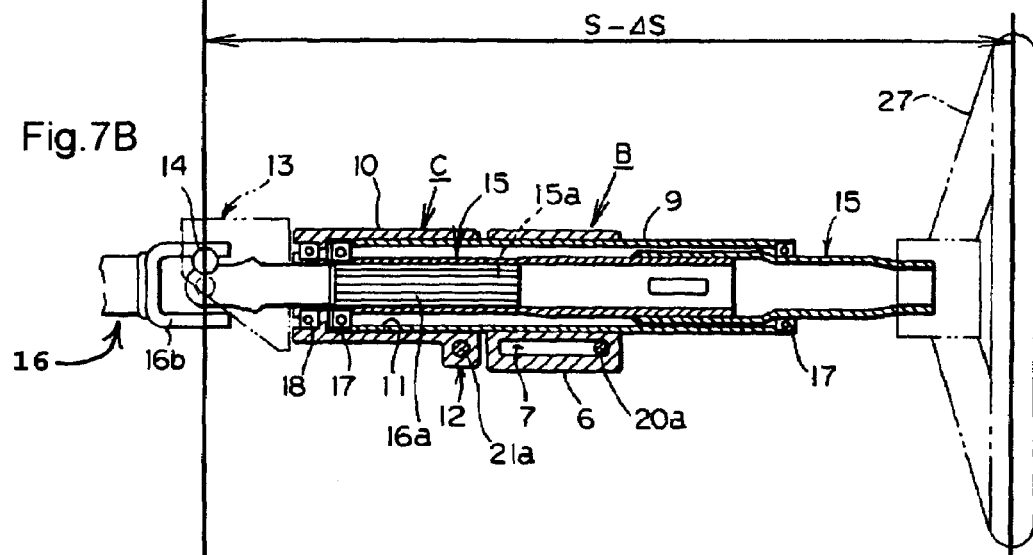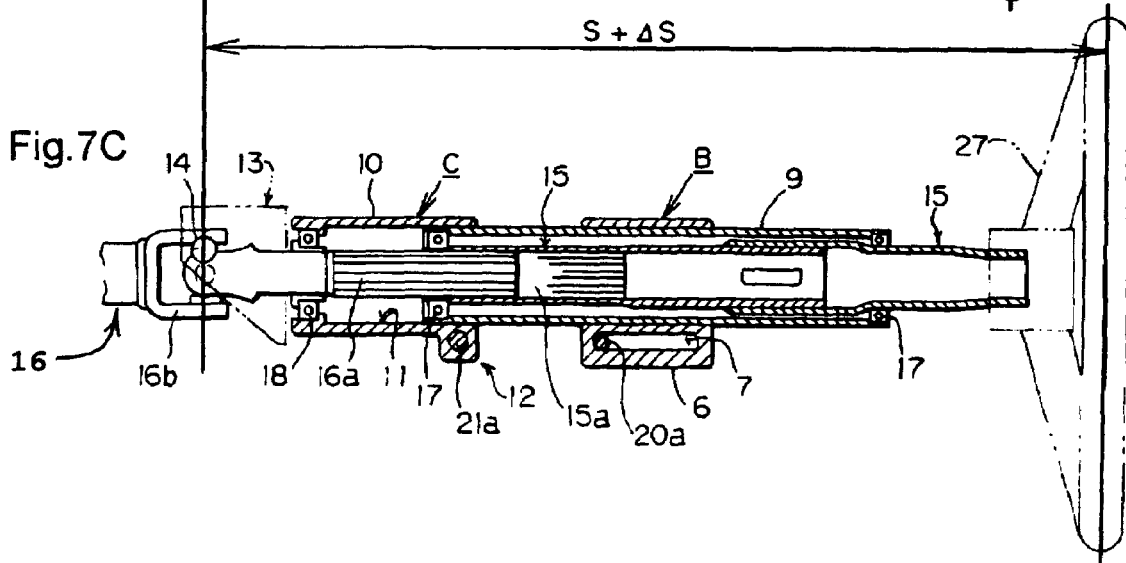

STEERING WHEEL POSITION ADJUSTMENT DEVICE

BACKGROUND OF THE INVENTION

1. Field of the Invention

The present invention relates to a steering wheel position adjustment device in which there is almost no change in operation feeling particularly prior or posterior to telescopic adjustments, and that is capable of maintaining good operation feeling in a steering device provided with a tilt and telescopic adjustment mechanism.

2. Description of the Related Art

Conventionally there are many types of steering device provided with a tilt and telescopic adjustment mechanism. In particular, Japanese Patent Application Laid-open No. 2000-16305 is a device developed previously by an applicant in which tilt and telescopic position adjustments of the steering wheel can be made.

SUMMARY OF THE INVENTION

However, in most of the steering devices provided with tilt and telescopic adjustment mechanisms, such as Japanese Patent Application Laid-open No. 2000-16305, when carrying out tilt adjustments the steering shaft is moved in the forward or backward axial direction, so the positions of the intermediate shaft and joint are changed. A universal joint is used in this joint, so if the position is changed to a certain extent the operation feeling is not affected to a great degree, but depending upon the driver a small change in feeling can be perceived. This phenomenon is seen in most steering devices provided with tilt and telescopic adjustment mechanisms. It is an object of the present invention to provide a steering device in which there is no change of operation feeling of the wheel due to this type of telescopic adjustment of position, and for which good operation feeling can be maintained.

Therefore, as a result of dedicated research to solve the above problems, the inventors solved the problem with the invention according to claim 1. A column housing through which a column pipe passes and is fixed thereto is fitted to a fixed bracket so that the column housing can either move freely or be fixed in the axial direction. The column pipe is inserted slidably in an insertion hole of a pivot housing that is fitted to be able to swing freely and be fixed freely to the front of the column housing in the axial direction. An upper shaft is provided, within the column pipe, that moves together with the column pipe in the axial direction. A lower shaft is provided in the pivot housing. The upper shaft transmits rotation to the lower shaft, and the upper shaft and the lower shaft are connected to be able to slide freely relative to each other.

Next, the invention according to claim 2 solves the problem with a steering wheel position adjustment device including a fixed bracket having fixed support side parts on both sides in the width direction; a column housing fitted to the fixed bracket so that the column housing can move freely in the axial direction or be fixed as appropriate; a column pipe that passes through and is fixed to the column housing; an upper shaft having a transmission shaft part at an end in the axial direction and that is fitted within the column pipe to be able to rotate freely; a pivot housing, through which the column pipe is slidably inserted, and which has an insertion hole provided with a fastening part that fastens and fixes the column pipe at the appropriate position, and which is supported to pivot so as to swing freely and to be fixed freely in the fixed bracket; and a lower shaft, connected to a transmission shaft part of the upper shaft, having a transmission shaft part to which rotation is transmitted, wherein the lower shaft is fitted to be able to freely rotate within the pivot housing, and the transmission shaft part of the lower shaft and the transmitted shaft part of the upper shaft are connected to be able to freely slide.

Next, the invention according to claim 3 solves the problem in a steering wheel position adjustment device with the above configuration, further including a first fastening adjustment fitting that passes through a set of tilt adjustment elongated holes formed in the fixed support side parts of the fixed bracket and a telescopic elongated hole formed in the column housing for carrying out fastening; and a second fastening adjustment fitting that passes through another set of tilt adjustment elongated holes and the fastening bolt holes formed in the fastening part of the pivot housing for carrying out fastening. The invention according to claim 4 solves the problem in a steering wheel position adjustment device with the above configuration, wherein a link is provided between the first fastening adjustment fitting and the second fastening adjustment fitting, and further comprises a locking lever provided on either the first fastening adjustment fitting or the second fastening adjustment fitting, for fastening.

The invention according to claim 5 solves the problem in a steering wheel position adjustment device with the above configuration, wherein a slit-shaped cut-out is formed in the axial direction of the insertion hole of the fastening part of the pivot housing, and on both sides of the cut-out in the width direction fastening bolt holes are formed through which the second fastening adjustment fitting passes.

According to the inventions of claims 1 and 2, during telescopic adjustments only the column housing, column pipe, and the upper shaft to which the steering wheel is fitted move. The pivot housing and lower shaft do not move during telescopic adjustments, but remain static. Therefore, the universal joint of the lower shaft and the steering shaft also does not move, so good operation feeling can be maintained.

The invention according to the claim 3 is provided with the first fastening adjustment fitting to fasten the column housing to the fixed bracket. Furthermore the second fastening adjustment fitting that fastens the column pipe at the fastening part of the pivot housing is provided on the fixed bracket. Therefore fixing the column housing and fixing the column pipe that is inserted in the pivot housing can be carried out separately. Also, the fixing condition of the column housing as well as the column pipe can be very strong and stable. In the invention according to claim 4, a link is provided between the first fastening adjustment fitting and the second fastening adjustment fitting. Therefore the first fastening adjustment fitting and the second fastening adjustment fitting can be fastened at the same time with the locking lever, and telescopic adjustments can be carried out efficiently.

According to the invention of claim 5, the pivot housing is the center of pivoting for tilt movements, so it is not necessary to provide a new joint for the steering device, and the structure is simple. According to the invention of claim 5, a slit-shaped cut-out is formed in the fastening part in the axial direction of the insertion hole. Fastening bolt holes are formed at the cut-out on both sides in the width direction through which the second fastening adjustment fitting passes, which is a very simple structure, and the column pipe can be securely fixed.

BRIEF DESCRIPTION OF THE DRAWINGS

FIG. 1A is a side view of the present invention, 1B is a vertical sectioned view of 1A with the fixed bracket removed;

Figure 3:
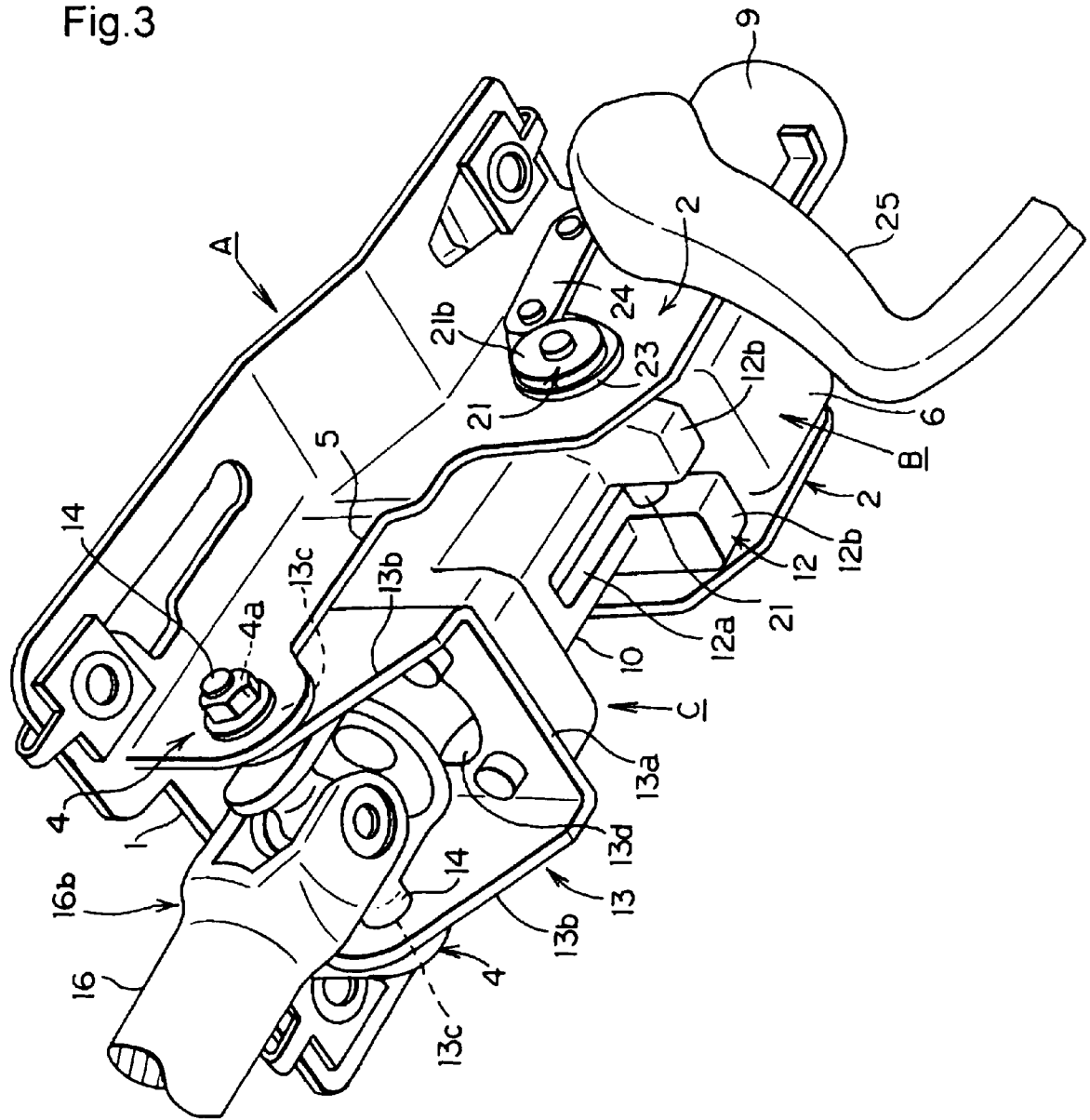
Figure 4:
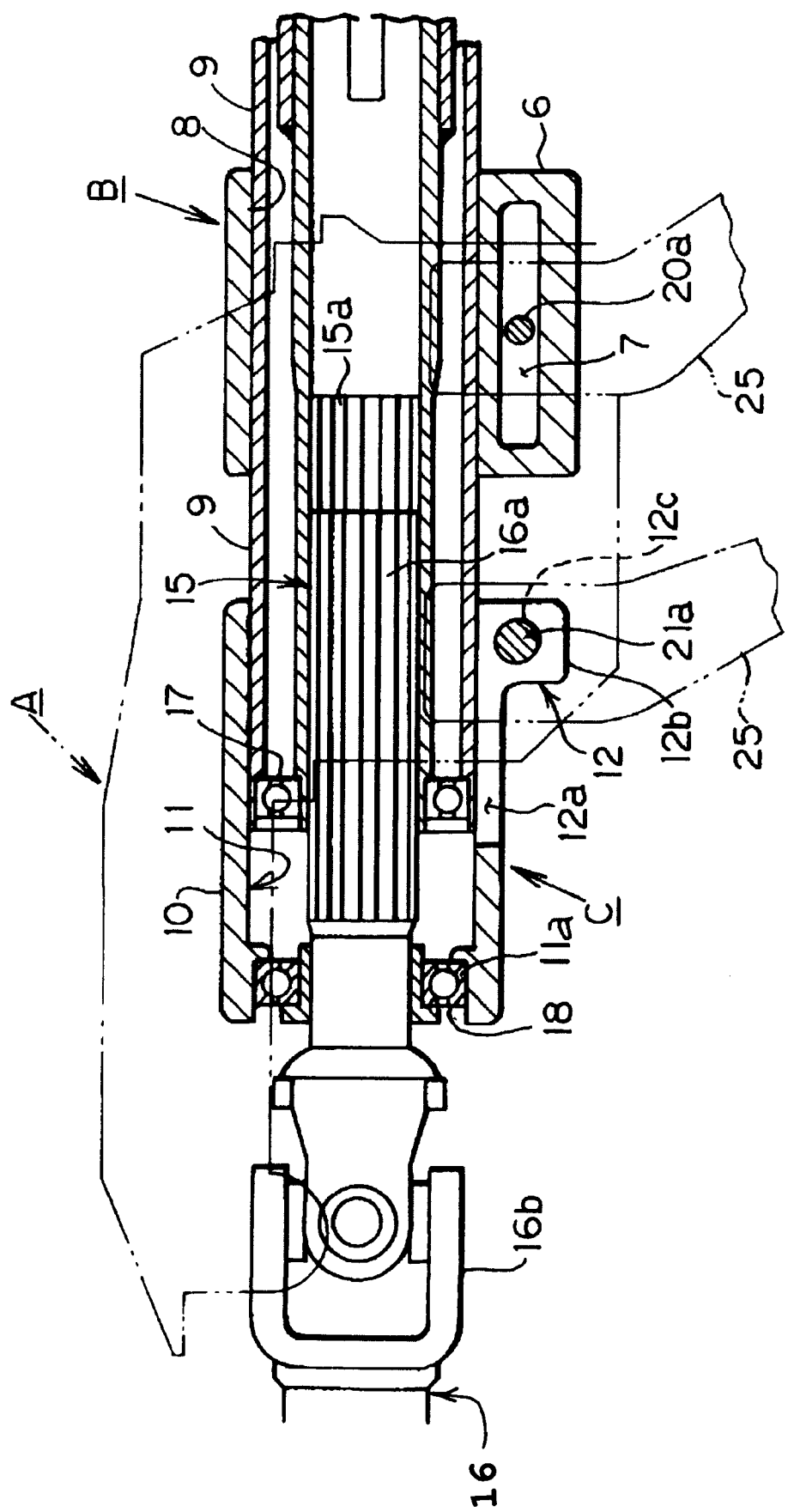
Figure 5A:
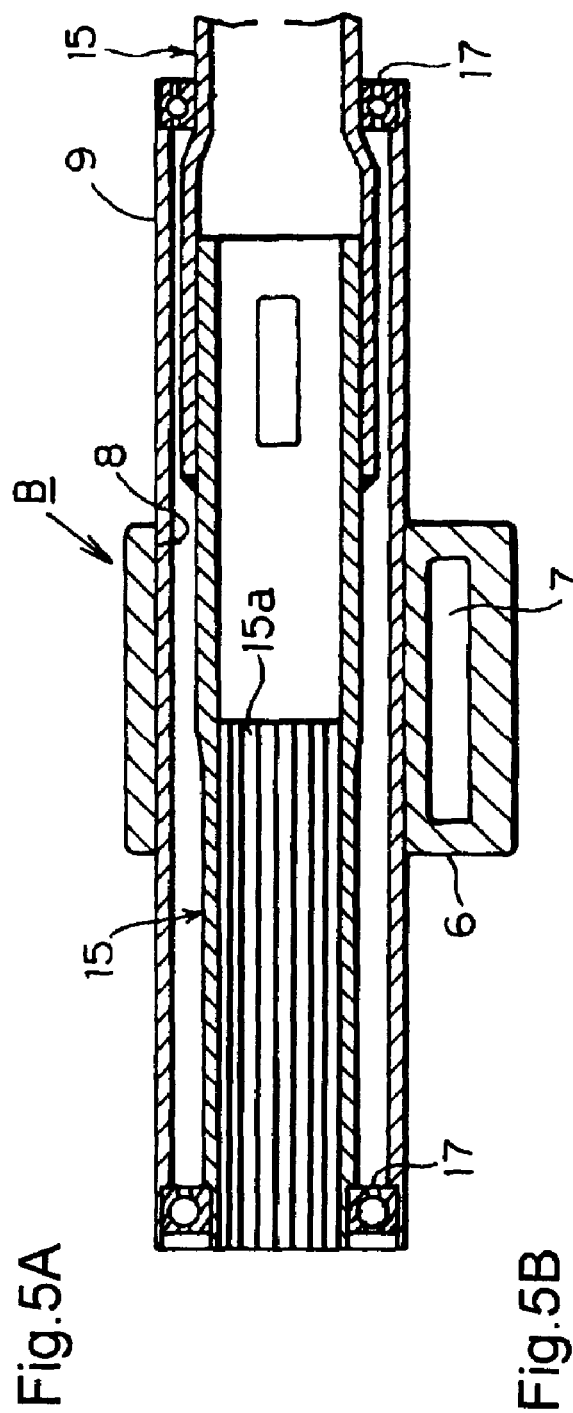
Figure 6A:
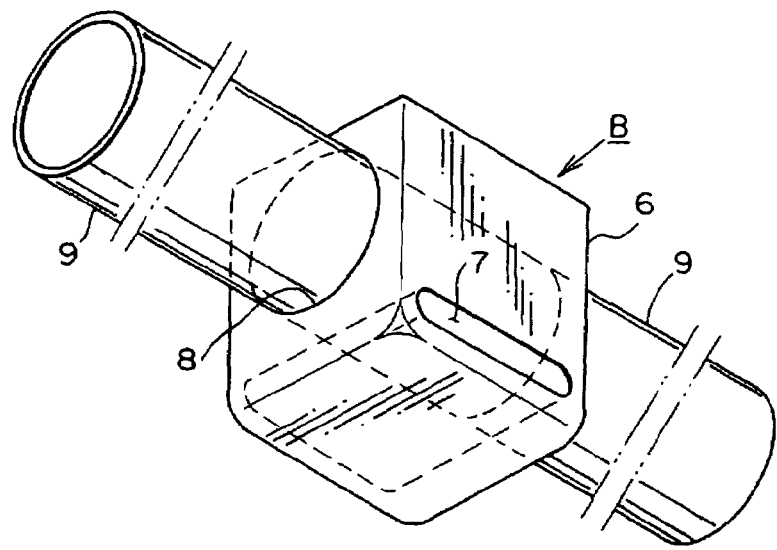
Figure 8:
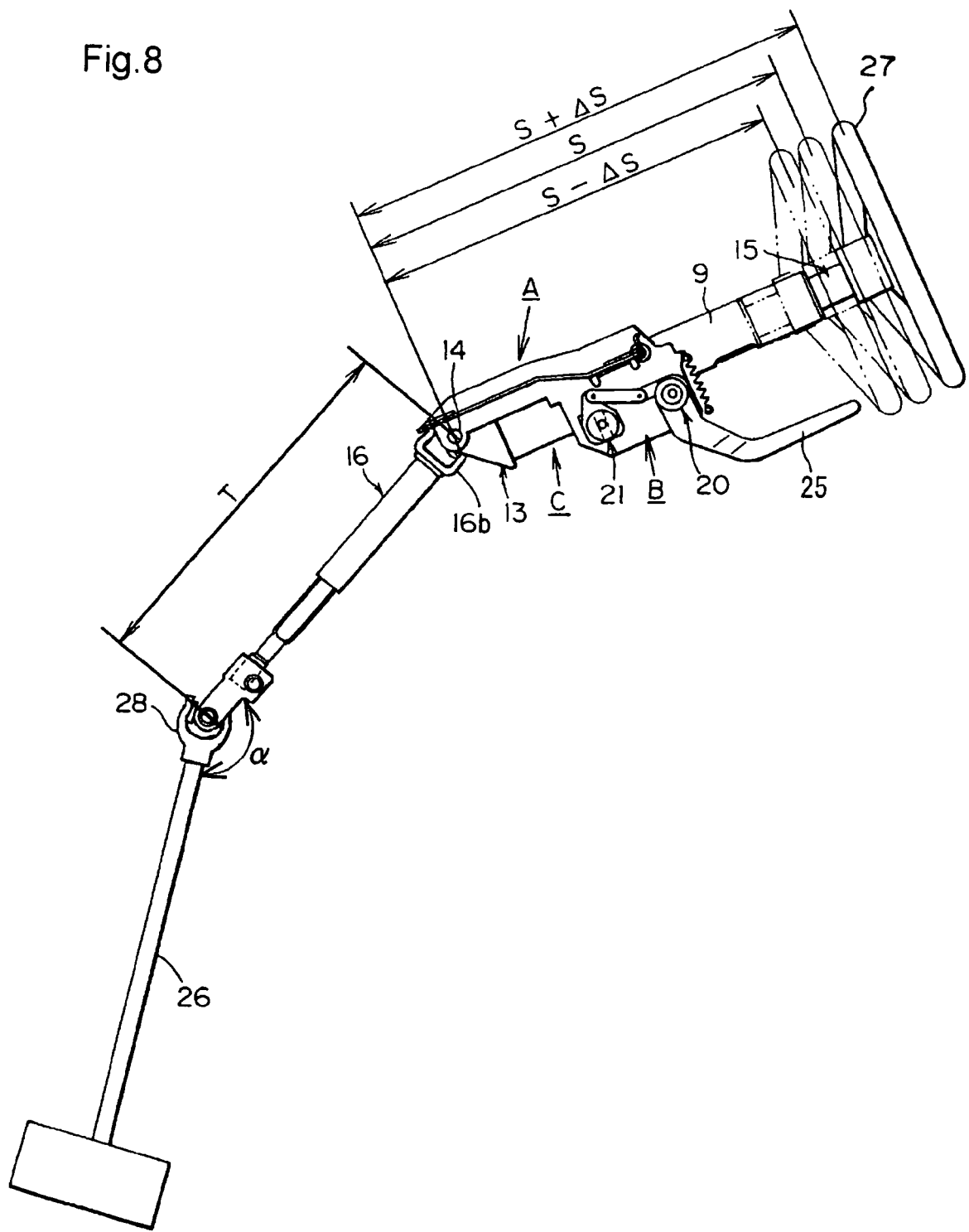

FIG. 3 is an isometric view of the main part of the present invention;

FIG. 4 is an enlarged vertical sectioned view of part of the present invention;

FIG. 5A is a vertical sectioned view of the column pipe and upper shaft fitted to the column housing, 5B is vertical sectioned view of the lower shaft fitted to the pivot housing;

FIG. 6A is an isometric view of the column pipe fitted to the column housing, 6B is an exploded isometric view of the pivot housing;

FIG. 7A is a view with the wheel in the standard position, 7B is a view in the shortest position due to telescopic adjustment, and 7C is a view in the longest position due to telescopic adjustment; and FIG. 8 is an operation diagram showing that telescopic adjustments in the present invention do not affect the operation feel.

DESCRIPTION OF THE PREFERRED EMBODIMENTS

The following is the description of the preferred embodiments based upon the drawings. The present invention includes mainly a fixed bracket A, a column housing B, a column pipe 9, an upper shaft 15, a pivot housing C, a lower shaft 16, a first fastening adjustment fitting 20, a second fastening adjustment fitting 21, and a locking lever 25. First, the fixed bracket A includes a pair of plate-shaped fixed support side parts 2, 2 formed in confrontation to each other at the two sides in the width direction of a head part 1, as shown in FIGS. 1A, 2A, 2C, and 2D, and elsewhere. A fitting is formed at a prescribed position on the head part 1 to which a capsule member for shock absorption is fitted. The head part 1 is mounted to the vehicle body at the prescribed position via the capsule member. The structure is such that only when an impact occurs such as a crash, impact energy is absorbed through sliding relative to the mounting position, which softens the impact and protects the driver from the accident.

A sloping surface is formed in the head part 1 at approximately the middle in the long direction. A step is formed in the head part 1 by the sloping surface. Specifically, the front side of the head part 1 in the long direction (the front wheel side) is formed higher than the rear side (steering wheel 27 side). The pair of fixed support side parts 2, 2 support while sandwiching the column housing B and part of a pivot housing C which are described later, so that tilt and telescopic adjustments can be carried out (see FIGS. 2B, 2C, and 3). The column housing B can move freely in the axial direction relative to the fixed bracket A and is fixed as appropriate to the fixed bracket A. Also, the pivot housing C is pivotally supported so that the pivot housing C can pivot freely and be fixed freely relative to the fixed bracket A. The means of fixing the column housing B and the pivot housing C to the fixed bracket A is the first fastening adjustment fitting 20 and the second fastening adjustment fitting 21, which are described later.

Figure 2A:
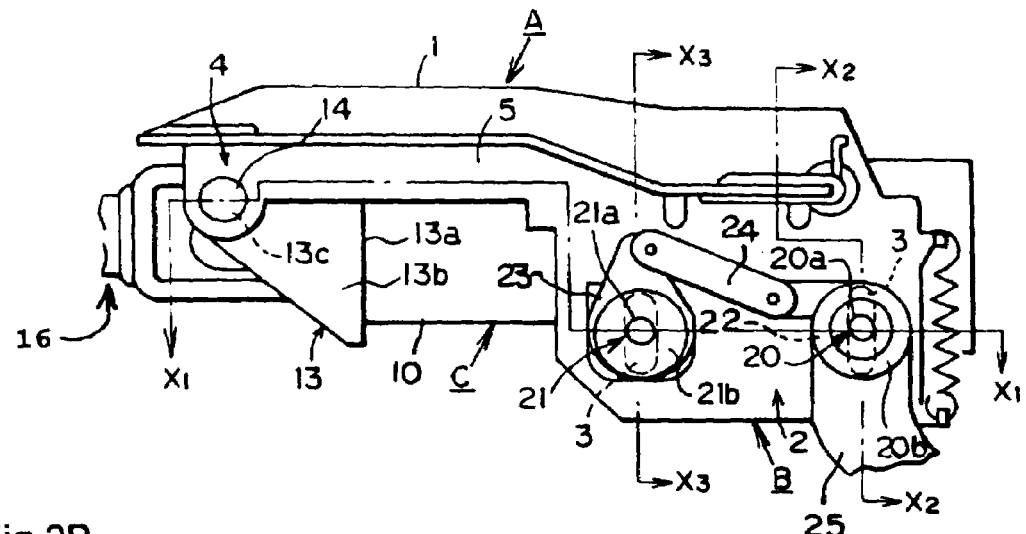
FIG. 2A is an enlarged side view of part of the present invention, 2B is a sectioned view at $X_1$-$X_1$ in 2A in the direction of the arrows, 2C is a sectioned view at $X_2$-$X_2$ in 2A in the direction of the arrows, 2D is a sectioned view at $X_3$-$X_3$ in 2A in the direction of the arrows.
Figure 2B:
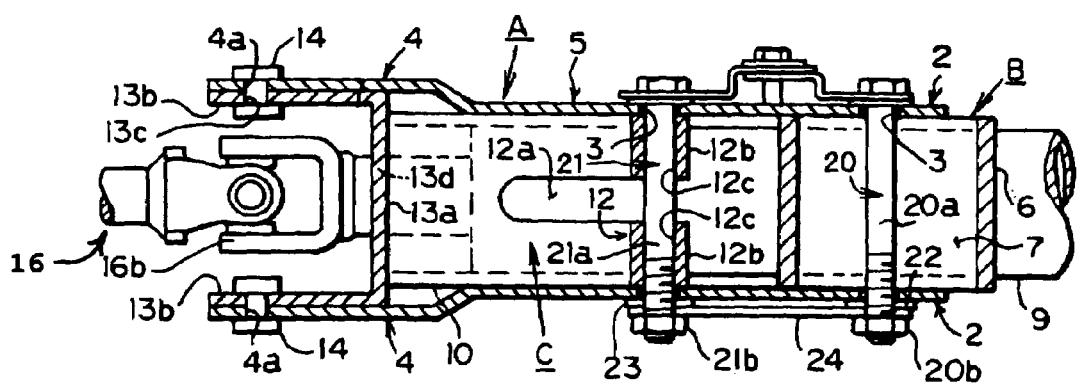

A pair of tilt adjustment elongated holes 3, 3 is formed in each of the pair of fixed support side parts 2, 2. Specifically, as shown in FIGS. 1A, 2A, 2B, and elsewhere, two tilt adjustment elongated holes 3, 3 are formed in each fixed support side part 2 in the long direction of the fixed bracket A. The tilt adjustment elongated holes 3 are elongated in the vertical direction. Furthermore, as shown in FIGS. 1A and 2A, two opposing pivot supports 4, 4 are formed in the head part 1 in the front of the long direction and at both sides in the width direction. The two pivot supports 4, 4 are plate shaped, in which pivot support holes 4a, 4a are formed (see FIG. 2B).

The pair of pivot supports 4, 4 enclose a pivot part 13 of the pivot housing C, which is described later, and support the pivot housing C so that it can pivot freely (see FIGS. 2B, 2D, and 3). The pivot supports 4, 4 are made continuous with the fixed support side parts 2, 2 with a pair of continuity plates 5, 5. Specifically, along the long direction of the head part 1 from the rear side to the front side the fixed support side parts 2, the continuity plates 5, and the pivot supports 4 are formed continuously. Also, the continuity plates 5, 5 perform the role of reinforcing the fixed support side parts 2 and the pivot supports 4.

Figure 2C:
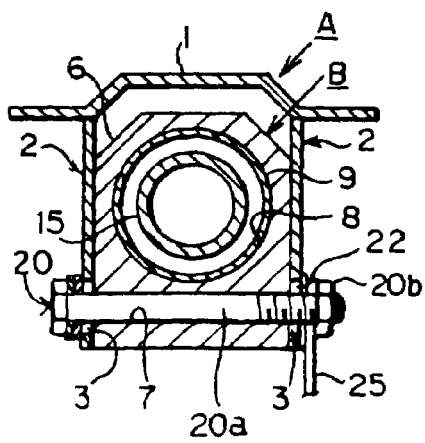
Figure 2D:
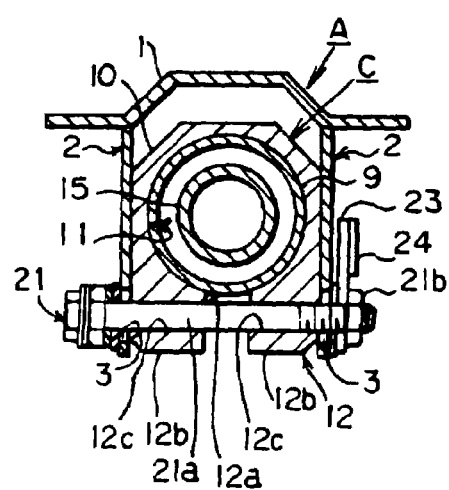

Next, as shown in FIGS. 2B, 2C, 3, 5A, and 6A, the column housing B includes a main housing 6, a telescopic elongated hole 7, and a column through hole 8. The main housing 6 is formed as an approximately cubic shaped block, as shown in FIG. 6A. The telescopic elongated hole 7 penetrates the main housing 6 in the width direction, as shown in FIGS. 2B, 2C, 6A, and elsewhere. The telescopic elongated hole 7 is also elongated in the long direction of the main housing 6. Also, the column through hole 8 is formed in the long direction of the main housing 6 from the rear side to the front side.

The telescopic elongated hole 7 and column through hole 8 are formed at a suitable spacing in the vertical direction of the main housing 6, as shown in FIG. 6A. The column through hole 8 is positioned higher than the telescopic elongated hole 7. A column pipe 9 passes through the column through hole 8 and is fixed and anchored. The column pipe 9 is fixed to that it projects from the column housing B at both ends in the axial direction. A specific example of the fixing means is press fitting.

Next, as shown in FIGS. 2B, 2D, 3, 5B, 6B, and elsewhere, the pivot housing C includes a main housing 10, and the pivot part 13. The main housing 10 includes an insertion hole 11 and a fastening part 12. The main housing 10 is formed as an approximately cubic shaped block. The insertion hole 11 is formed as a through hole in the long direction of the main housing 10. The insertion hole 11 overlaps with the external surface of the column pipe 9 fixed to the column housing B, as shown in FIGS. 1B and 4, so that the column pipe 9 can slide within the insertion hole 11, as shown in FIGS. 7A through 7C.

Figure 6B:
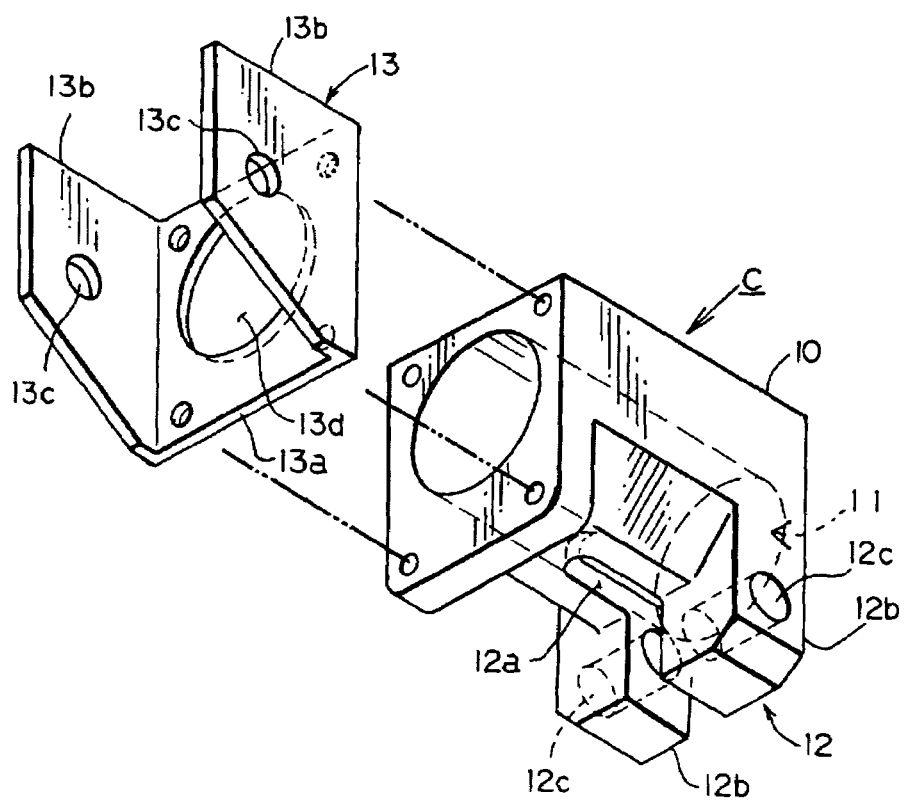

In other words, the insertion hole 11 of the pivot housing C is a part that supports the sliding movement in the telescopic adjustments of the column pipe 9, as shown in FIGS. 4, 7, and elsewhere. The fastening part 12 performs the role of fixing the column pipe 9 that slides freely within the insertion hole 11 at a suitable position. Specifically, as shown in FIGS. 2B, 3, 6B, and elsewhere, an approximately U-shaped cut-out 12a is formed along the long direction of the insertion hole 11 up to approximately the middle of the main housing 10 in the long direction. A pair of fastening projections 12b, 12b are formed near the cut-out 12a and to the rear end of the main housing 10 in the long direction.

The fastening projections 12b are provided on both sides of the cut-out 12a and in confrontation to each other in the width direction. A pair of fastening bolt holes 12c, 12c are formed in the fastening projections 12b, 12b, as shown in FIGS. 2D and 6B, through which the second tightening adjustment fitting 21, which is described later, passes. Then by bringing the fastening projections 12b, 12b closer to each other, the cut-out 12a is narrowed in the width direction, and the column pipe 9 inserted in the insertion hole 11 is fastened and fixed at the desired position.

Also, the pivot part 13 is fitted to the pivot supports 4, 4 of the fixed bracket A by a pair of pivot pins 14, 14 so that the pivot housing C is supported so that it can pivot freely, and function as a support point when adjusting the tilt of the steering wheel 27. The pivot part 13 is formed at the front end in the long direction of the main housing 10 (see FIG. 1A). The specific form of the pivot part 13, as shown in FIG. 6B, is a component separate from the main housing 10, fixed to the main housing 10 with fasteners such as screws or bolts. The pivot part 13 includes a connection part 13a and a pair of pivot side plates 13b, 13b. The two pivot side plates 13b, 13b are formed in confrontation with each other at the two ends in the width direction of the connection part 13a. Pivot holes 13c, 13c are formed in each pivot side plate 13b, 13b.

Then the pivot housing C can pivot about the pivot holes 13c, 13c in the vertical direction, to form the tilt adjustment mechanism for the steering wheel 27. Also, a shaft through hole 13d is formed in the connection part 13a, and part of the lower shaft 16, which is described later, passes through the shaft through hole 13d in the axial direction (see FIG. 2B). Then the pivot part 13 is arranged between the two pivot support parts 4, 4 of the fixed bracket A, as shown in FIG. 2B, and the pivot support holes 4a of each pivot support part 4 and the pivot holes 13c of the pivot side plates 13b are connected so as to allow pivoting with the pivot pin 14, such as bolt and nut or pin members, etc.

In this way, the pivot housing C can pivot in the vertical direction relative to the fixed bracket A. In this description the main housing 10 and the pivot part 13 are separate components, but the main housing 10 and the pivot part 13 may be formed integrally.

Next, as shown in FIGS. 1B, 4, 5A, and elsewhere, the upper shaft 15 is fitted within the column pipe 9 so that it can freely rotate in the axial peripheral direction. A pair of bearings 17, 17 is provided on the column pipe 9 at the front and rear ends in the axial direction. The upper shaft 15 is supported through the bearings 17, 17. Also, a transmission shaft part 15a is formed in the upper shaft 15 in the front end in the axial direction, and the steering wheel 27 is fitted to the rear end in the axial direction.

Figure 5B:
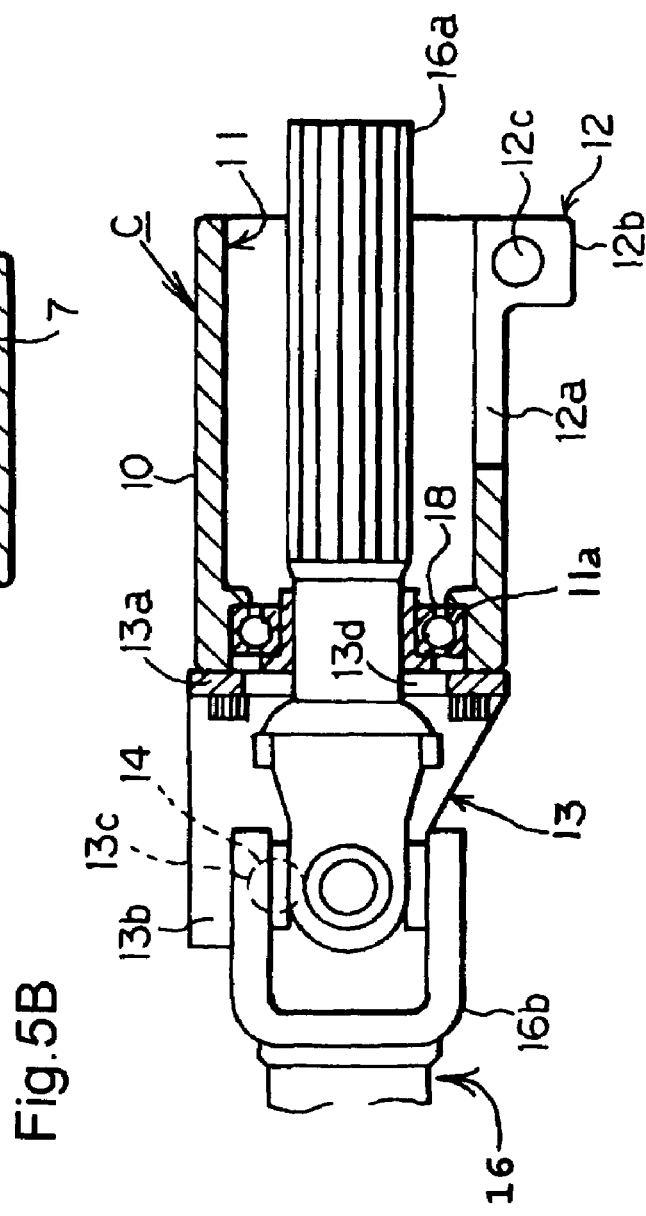

Next, as shown in FIGS. 4 and 5B, a transmission shaft part 16a is formed in the lower shaft 16 at one end in the axial direction, and there is a universal joint 16b at a suitable position about the middle in the axial direction. The lower shaft 16 is fitted to the insertion hole 11 of the pivot housing C so that it can freely rotate in the axial peripheral direction, as shown in FIGS. 1B and 4. Specifically, the transmission shaft part 16a of the lower shaft 16 is inserted in the insertion hole 11 of the pivot housing C, and is supported so that it can freely rotate by a bearing 18 at the front end position 11a of the insertion hole 11 in the long direction.

The transmission shaft part 16a of the lower shaft 16 and the transmission shaft part 15a of the upper shaft 15 are connected so that axial rotations are transmitted. Specifically, splines are formed on the transmission shaft part 15a and the transmission shaft part 16a, those on the transmission shaft part 15a being internal splines, and those on the transmission shaft part 16a being external splines. Then the transmission shaft part 16a is inserted in the transmission shaft part 15a. Therefore the upper shaft 15 and the lower shaft 16 can freely expand and contract at the position of the connection of the transmission shaft part 15a and the transmission shaft part 16a. Also, the rotation of the upper shaft 15 due to the action of the steering wheel 27 can be transmitted to the lower shaft 16 (see FIG. 7).

In other words, when the column pipe 9 slides relative to the pivot housing C, the transmission shaft part 15a of the upper shaft 15 slides relative to the transmission shaft part 16a of the lower shaft 16. In this way, when making telescopic adjustments, even if the upper shaft 15 moves in the axial direction the lower shaft 16 does not move. Therefore the position of a universal joint 28 on a steering shaft 26 connected to a steering device on the front wheels does not change. Therefore the operation feeling can be maintained constant (see FIG. 8).

The column housing B in which the column pipe 9 is fitted is arranged between the two fixed support side parts 2, 2 of the fixed bracket A towards the rear in the long direction. The first fastening adjustment fitting 20 is fitted to the tilt adjustment holes 3, 3 formed in the two fixed support side parts 2, 2 and the telescopic adjustment elongated hole 7 of the column housing B (see FIGS. 2A, 2B, and 2C). Also, the pivot housing C is arranged between the fixed support side parts 2, 2 towards the front in the long direction. The second fastening adjustment fitting 21 is fitted to the fastening bolt holes 12c, 12c of the two fastening projections 12b, 12b of the pivot housing C and another set of tilt adjustment elongated holes 3, 3 (see FIGS. 2A, 2B, and 2D).

The first fastening adjustment fitting 20 includes a first bolt 20a and a first fastening nut 20b. The second fastening adjustment fitting 21 includes a second bolt 21a and a second fastening nut 21b. The first bolt 20a is passed through the tilt adjustment elongated holes 3, 3 in the rear side (towards the steering wheel 27) of the fixed support side parts 2, 2 of the fixed bracket A and the telescopic adjustment hole 7 of the column housing B. The first fastening nut 20b is threaded onto the threaded part of the first bolt 20a projecting from the fixed support side part 2, so that the fixed support side parts 2, 2 can be tightened.

Also, the second bolt 21a is passed through the tilt adjustment elongated holes 3, 3 on the front side (towards the front wheels) of the fixed support side parts 2, 2 of the fixed bracket A and the fastening bolt hole 12c of the fastening part 12 of the pivot housing C. The second fastening nut 21b is threaded onto the threaded part of the second bolt 21a projecting from the fixed support side part 2, so that the fixed support side parts 2, 2 can be tightened. At the same time the column pipe 9 inserted in the insertion hole 11 is fixed by the fastening part 12 of the pivot housing C.

A first arm 22 is fixed to the first fastening nut 20b on the outside of the fixed support side part 2 on one side of the fixed bracket A so that the first arm 22 rotates together with the first fastening nut 20b. Also, a second arm 23 is fixed to the second fastening nut 21b so that the second arm 23 rotates together with the second fastening nut 21b. A link 24 pivotally connects the first arm 22 and the second arm 23. Furthermore, a locking lever 25 is fitted to the first fastening nut 20b of the first fastening adjustment fitting 20 (see FIGS. 2A and 2B).

When the locking lever 25 is rotated, the first fastening nut 20b as well as the first arm 22 rotate, and this rotation is transmitted to the second arm 23 by the link 24. Therefore it is possible to carry out the fastening or releasing operations for the first fastening adjustment fitting 20 and the second fastening adjustment fitting 21 at the same time by the rotation of the locking lever 25. Also, the locking lever 25 may be fitted to the second fastening nut 21b side of the second fastening adjustment fitting 21 (see the imaginary line in FIG. 4).

In this case the column housing B and the pivot housing C can be separately locked or released. Also, a retaining member is fitted on the outside of the fixed support side plate 2 on the other side of the fixed bracket A so that the first bolt 20a of the first fastening adjustment fitting 20 and the second bolt 21a of the second fastening adjustment fitting 21 will not idle. Besides the first fastening adjustment fitting 20 and the second fastening adjustment fitting 21 as described above, a cam mechanism or similar may be used as the means of fixing the column housing B and the pivot housing C to the fixed bracket A. Also, another fastening mechanism may be used.

Also, as shown in FIG. 2C, the first fastening adjustment fitting 20 performs the role of holding, fastening, and fixing the column housing B between the two fixed support side parts 2, 2. Also, as shown in FIG. 2D, the second fastening adjustment fitting 21 performs the role of holding, fastening, fixing the pivot housing C via the two fixed support side parts 2, 2. In addition, by bringing the two fastening projections 12b, 12b of the fastening part 12 of the pivot housing C and the cut-out 12a closer, the second fastening adjustment fitting 21 performs the role of fixing the column pipe 9 to the desired position.

Tilt and telescopic adjustments with the present invention are carried out by first rotating the locking lever 25, which loosens the first fastening adjustment fitting 20 and the second fastening adjustment fitting 21. Then the telescopic adjustment is carried out within the range of the telescopic elongated hole 7 of the column housing B. FIG. 7A shows the standard position of the steering wheel 27, which is at a distance S from the position of the pivot pin 14 of the pivot housing C. FIG. 7B shows the steering wheel 27 moved forward (towards the front wheels of the vehicle), so that the steering wheel 27 is at a distance (S−ΔS) from the position of the pivot pin 14 of the pivot housing C. FIG. 7C shows the wheel 27, so that the steering wheel 27 is at a distance (S+ΔS) from the position of the pivot pin 14 of the pivot housing C.

Also, tilt adjustments can be carried out at the same time using the tile adjustment elongated holes 3, 3 for the two fixed support side parts 2, 2. During telescopic adjustment the column housing B moves due to the telescopic adjustment, and the column pipe 9 slides within the insertion hole 11 of the pivot housing C. Furthermore, the transmission shaft part 15a of the upper shaft 15 fitted within the column pipe 9 slides relative to the transmission shaft part 16a of the lower shaft 16 which is arranged within the insertion hole 11 of the pivot housing C.

At this time the pivot housing C and the lower shaft 16 cannot move in the axial direction. Therefore the universal joint 28 that connects the lower shaft 16 with the steering shaft 26, as shown in FIG. 8, does not move, and the operation feeling is maintained constant. In other words, in the present invention, when telescopic adjustments of the steering wheel 27 are made, the extension and contraction occur through movement of the column housing B, column pipe 9, and upper shaft 15. The pivot housing C and lower shaft 16 do not move in the direction of the telescopic adjustment. Therefore, the distance T from the pivot pin 14 of the pivot housing C to the universal joint 28 that connects with the steering shaft 26 is always constant. Therefore the angle of inflection α of the universal joint 28 connecting the steering shaft 26 and the lower shaft 16 is also constant. Therefore the rotation force at the wheel 27 is also constant; and the operation feeling at the wheel 27 can be maintained constant.

Therefore, in telescopic adjustment, the joint with the steering shaft 26 does not move, so telescopic adjustment does not affect the steering shaft 26, so the operation feeling is good. Also, the first fastening adjustment fitting 20 and the second fastening adjustment fitting 21 can be fastened at the same time by operating the locking lever 25, through the first arm 22, the link 24, and the second arm 23. Therefore, very accurate fastening can be achieved and high stiffness obtained.

What is claimed is:

1. A steering wheel position adjustment device, comprising:

a fixed bracket comprising fixed support side parts on both sides in a width direction;

a column housing formed between the fixed support side parts of said fixed bracket on a rear side of said fixed bracket in a lengthwise direction, said column housing fitted to the fixed bracket such that the column housing is one of freely moveable in an axial direction and fixable;

a column pipe that passes through and is fixed to the column housing;

an upper shaft fitted within the column pipe such that the upper shaft rotates freely, the upper shaft comprising a transmission shaft part at an end of the upper shaft in the axial direction that is fitted within the column pipe so as to be able to rotate freely;

a pivot housing, formed between said fixed support side parts of said fixed bracket on a front side of said fixed bracket in the lengthwise direction, through which the column pipe is slidably inserted, the pivot housing supported relative to the fixed bracket such that the pivot housing is able to swing freely and be fixed, the pivot housing comprising an insertion hole provided with a fastening part that fastens and fixes the column pipe in the axial direction;

a lower shaft for connecting to the transmission shaft part of the upper shaft, the lower shaft comprising a transmission shaft part to which rotation is transmiitted;

a first fastening adjustment fitting that clamps and fixes said column housing, said first fastening adjustment fitting passing through a first set of tilt adjustment elongated holes formed in the fixed support side parts of the fixed bracket and a telescopic elongated hole formed in the column housing; and a second fastening adjustment fitting that clamps and fixes said pivot housing, said second fastening adjustment fitting passing through a second set of tilt adjustment elongated holes and fastening bolt holes formed in the fastening part of the pivot housing, wherein the lower shaft is fitted to be able to freely rotate within the pivot housing, and the transmission shaft part of the lower shaft and the transmission shaft part of the upper shaft are connected to be able to freely slide, and wherein the lower shaft remains stationary while the upper shaft moves in the axial direction.

2. The steering wheel position adjustment device according to claim 1, further comprising:

a locking lever for fastening, provided on one of the first fastening adjustment fitting and the second fastening adjustment fitting, wherein a link is provided between the first fastening adjustment fitting and the second fastening adjustment fitting.

3. The steering wheel position adjustment device according to claim 1, wherein a slit-shaped cut-out is formed in the axial direction of the insertion hole of the fastening part of the pivot housing, and wherein, on both sides of the cut-out in the width direction, the fastening bolt holes are formed though which the second fastening adjustment fitting passes.

4. The steering wheel position adjustment device according to claim 2, wherein a slit-shaped cut-out is formed in the axial direction of the insertion hole of the fastening part of the pivot housing, and wherein, on both sides of the cut-out in the width direction, the fastening bolt holes are formed through which the second fastening adjustment fitting passes.

* * * * *